(12) United States Patent
Wenger et al.

(10) Patent No.: US 11,539,820 B2
(45) Date of Patent: Dec. 27, 2022

(54) SIGNALING AND IDENTIFYING PICTURE BOUNDARY IN VIDEO PAYLOAD FORMAT OVER IP NETWORK

(71) Applicant: TENCENT AMERICA LLC, Palo Alto, CA (US)

(72) Inventors: Stephan Wenger, Hillsborough, CA (US); Byeongdoo Choi, Palo Alto, CA (US); Shuai Zhao, Pleasanton, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 96 days.

(21) Appl. No.: 17/077,546

(22) Filed: Oct. 22, 2020

(65) Prior Publication Data
US 2021/0306443 A1 Sep. 30, 2021

Related U.S. Application Data

(60) Provisional application No. 62/994,563, filed on Mar. 25, 2020.

(51) Int. Cl.
*H04L 69/22* (2022.01)
*H04L 65/65* (2022.01)

(52) U.S. Cl.
CPC ............ *H04L 69/22* (2013.01); *H04L 65/65* (2022.05)

(58) Field of Classification Search
CPC .............................. H04L 69/22; H04L 65/608
USPC ......................................................... 370/474
See application file for complete search history.

(56) References Cited

U.S. PATENT DOCUMENTS

| | | | |
|---|---|---|---|
| 2007/0206673 A1* | 9/2007 | Cipolli | H04N 21/4621 375/240.1 |
| 2014/0294093 A1* | 10/2014 | Wang | H04L 65/607 370/474 |
| 2015/0189331 A1* | 7/2015 | Koo | H04L 65/607 375/240.27 |
| 2016/0182587 A1* | 6/2016 | Annamraju | H04N 21/44209 709/219 |

* cited by examiner

*Primary Examiner* — Alan S Chou
(74) *Attorney, Agent, or Firm* — Sughrue Mion, PLLC

(57) ABSTRACT

A method, device, and computer-readable medium for packetizing a plurality of network abstraction layer (NAL) units of a picture using at least one processor, including obtaining the plurality of NAL units including a first NAL unit of the picture and a last NAL unit of the picture; splitting the first NAL unit of the picture into a first plurality of fragments and splitting the last NAL unit of the picture into a last plurality of fragments; packetizing the first plurality of fragments into a first plurality of fragmentation unit (FU) packets and packetizing the last plurality of fragments in to a last plurality of FU packets; and transmitting the first plurality of FU packets and the last plurality of FU packets, wherein a last FU packet of the last plurality of FU packets includes a last FU header including a last R bit, and wherein the last R bit is set to 1.

20 Claims, 9 Drawing Sheets

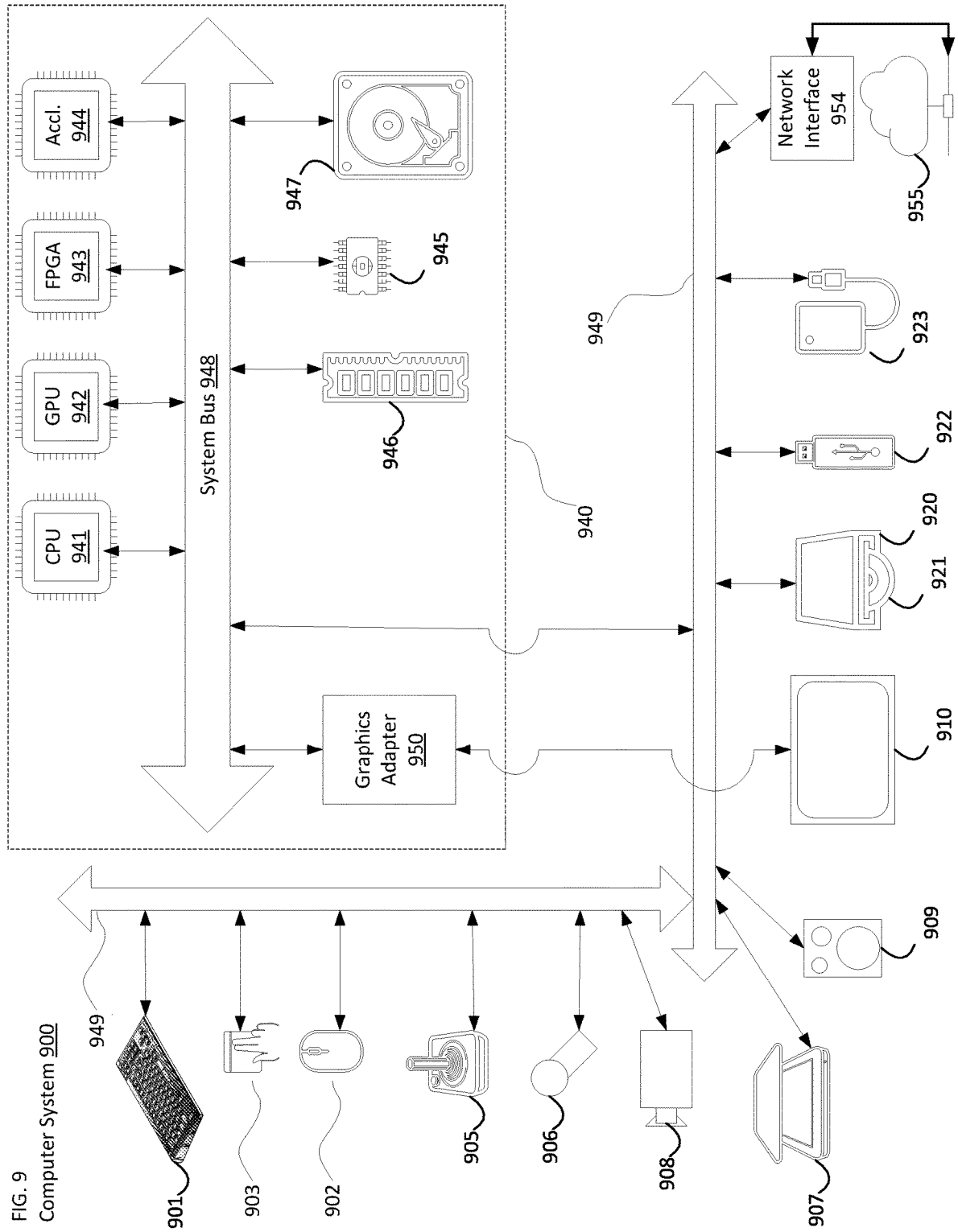

SIGNALING AND IDENTIFYING PICTURE BOUNDARY IN VIDEO PAYLOAD FORMAT OVER IP NETWORK

CROSS-REFERENCE TO RELATED APPLICATION

This application claims priority under 35 U.S.C. § 119 to U.S. Provisional Application No. 62/994,563, filed on Mar. 25, 2020, in the United States Patent & Trademark Office, the disclosure of which is incorporated herein by reference in its entirety.

FIELD

The disclosed subject matter relates to video coding and decoding, and more specifically, to the signaling of picture boundary information for supporting individual access of picture in the video payload format.

BACKGROUND

Real-time Transport Protocol (RTP), which is a network protocol to deliver video over IP networks, has been used in communication system utilizing streaming media, e.g. video conference applications. The RTP payload format for carrying the video data compliant with coding standard ITU-T Recommendation [H.266] and ISO/IEC International Standard [ISO23090-3], both also known as Versatile Video Coding (VVC) and developed by the Joint Video Experts Team (JVET) recently receives attention. The RTP payload format allows for packetization of one or more Network Abstraction Layer (NAL) units in each RTP packet payload as well as fragmentation of a NAL unit into multiple RTP packets.

At least some video coding standards recognize the concept of an Access Unit (AU). In a single-layer case, an access unit can be composed of a single coded picture. In other cases, especially those related to layered coding and Multiview coding, an AU can include multiple coded pictures sharing certain timing information, for example having the same presentation time.

An RTP header may include a so-called "Marker" bit (M-bit). By convention, in substantially all RTP payload formats that recognize the concept of an AU, the M-bit is specified to equal to one for the RTP packet carrying the last bitstring of the AU, and otherwise to be set to zero. When a receiver receives the RTP packet with the M-bit set, it knows that this RTP packet is the last packet of an AU and can handle it accordingly. Some details of such handling can be found in the RTP specification.

At least some video coding standards further recognize the concept of a coded picture, that can be different from an AU. AU and coded picture can be different, for example, if an AU is made up of several coded picture, as it may be the case when using spatial or SNR scalability; or in the case of redundant pictures.

If a sending endpoint obtains its sending video bitstream from a storage device/hard drive (16), such file may not include easily accessible meta information concerning access unit or coded picture boundaries, for example because the bitstream may be stored, for example, in a format commonly known as "Annex B bitstream". In such a scenario, there may be no Application Programmer's interface (API) information from the encoder to the RTP packetizer available that signals that a bitstring of the bitstream is the final bitstring of an AU or a coded picture. Instead, an RTP packetizer may have to identify the bitstring that includes the end of an AU or coded picture without side information usually obtainable by the encoder.

SUMMARY

In an embodiment, there is provided a method of packetizing a plurality of network abstraction layer (NAL) units of a picture using at least one processor, the method including obtaining the plurality of NAL units including a first NAL unit of the picture and a last NAL unit of the picture; splitting the first NAL unit of the picture into a first plurality of fragments and splitting the last NAL unit of the picture into a last plurality of fragments; packetizing the first plurality of fragments into a first plurality of fragmentation unit (FU) packets and packetizing the last plurality of fragments in to a last plurality of FU packets; and transmitting the first plurality of FU packets and the last plurality of FU packets, wherein a last FU packet of the last plurality of FU packets includes a last FU header including a last R bit, and wherein the last R bit is set to 1.

In an embodiment, there is provided a device for packetizing a plurality of network abstraction layer (NAL) units of a picture, the device including at least one memory configured to store program code; and at least one processor configured to read the program code and operate as instructed by the program code, the program code including: obtaining code configured to cause the at least one processor to obtain the plurality of NAL units including a first NAL unit of the picture and a last NAL unit of the picture; splitting code configured to cause the at least one processor to split the first NAL unit of the picture into a first plurality of fragments and splitting the last NAL unit of the picture into a last plurality of fragments; packetizing code configured to cause the at least one processor to packetize the first plurality of fragments into a first plurality of fragmentation unit (FU) packets and packetizing the last plurality of fragments in to a last plurality of FU packets; and transmitting code configured to cause the at least one processor to transmit the first plurality of FU packets and the last plurality of FU packets, wherein a last FU packet of the last plurality of FU packets includes a last FU header including a last R bit, and wherein the last R bit is set to 1.

In an embodiment, there is provided a non-transitory computer-readable medium storing instructions, the instructions including one or more instructions that, when executed by one or more processors of a device for packetizing a plurality of network abstraction layer (NAL) units of a picture, cause the one or more processors to: obtain the plurality of NAL units including a first NAL unit of the picture and a last NAL unit of the picture; split the first NAL unit of the picture into a first plurality of fragments and splitting the last NAL unit of the picture into a last plurality of fragments; packetize the first plurality of fragments into a first plurality of fragmentation unit (FU) packets and packetizing the last plurality of fragments in to a last plurality of FU packets; and transmit the first plurality of FU packets and the last plurality of FU packets, wherein a last FU packet of the last plurality of FU packets includes a last FU header including a last R bit, and wherein the last R bit is set to 1.

BRIEF DESCRIPTION OF THE DRAWINGS

Further features, the nature, and various advantages of the disclosed subject matter will be more apparent from the following detailed description and the accompanying drawings in which:

FIG. 9 is a schematic illustration of a computer system in accordance with an embodiment.

DETAILED DESCRIPTION

In embodiments, methods for signaling and identifying picture boundary of the Real-time Transport Protocol (RTP) payload format for Versatile Video Coding (VVC) and other protocols and codecs are described. The indication of picture boundary may allow an efficient playout butter handling.

Figure 1:
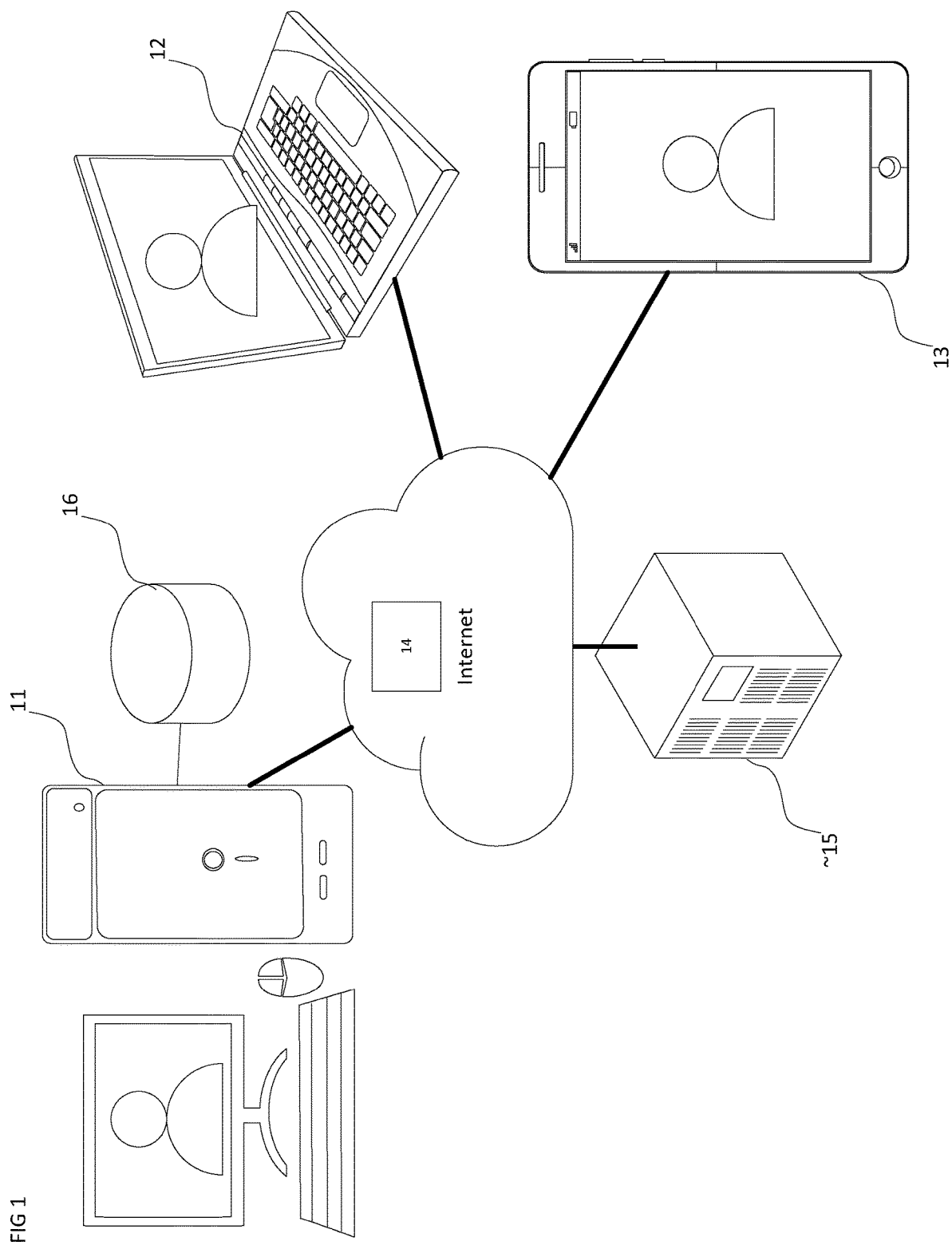
FIG. 1 is a schematic illustration of a simplified block diagram of a communication system in accordance with an embodiment.

Referring to FIG. 1, a communication system may include one or more endpoints (11, 12, 13) communicating with each other over an IP network (14) such as the Internet, using real-time media such as voice, video, and/or other media. The system may further include one or more media-aware network element(s) (15) configured, for example to manipulate the media sent by an endpoint before forwarding it to another endpoint.

In certain such system designs, an endpoint and/or a media aware network element (MANE) may include an RTP packetizer that sends RTP packets over a network to an RTP receiver located in, for example, another endpoint or MANE. In some cases, the sending endpoint may include a video camera, functionally coupled to a video encoder, which in turn is coupled to the packetizer, such that the video captured by the video camera is transported using RTP packets from the sending endpoint, for example endpoint (11), over the network (14) to a receiving endpoint, for example endpoint (12).

In certain cases, the sending endpoint may not include a video encoder. Instead, video may be obtained from a file stored on a hard drive or the like (16) coupled to the endpoint (11).

Figure 2:
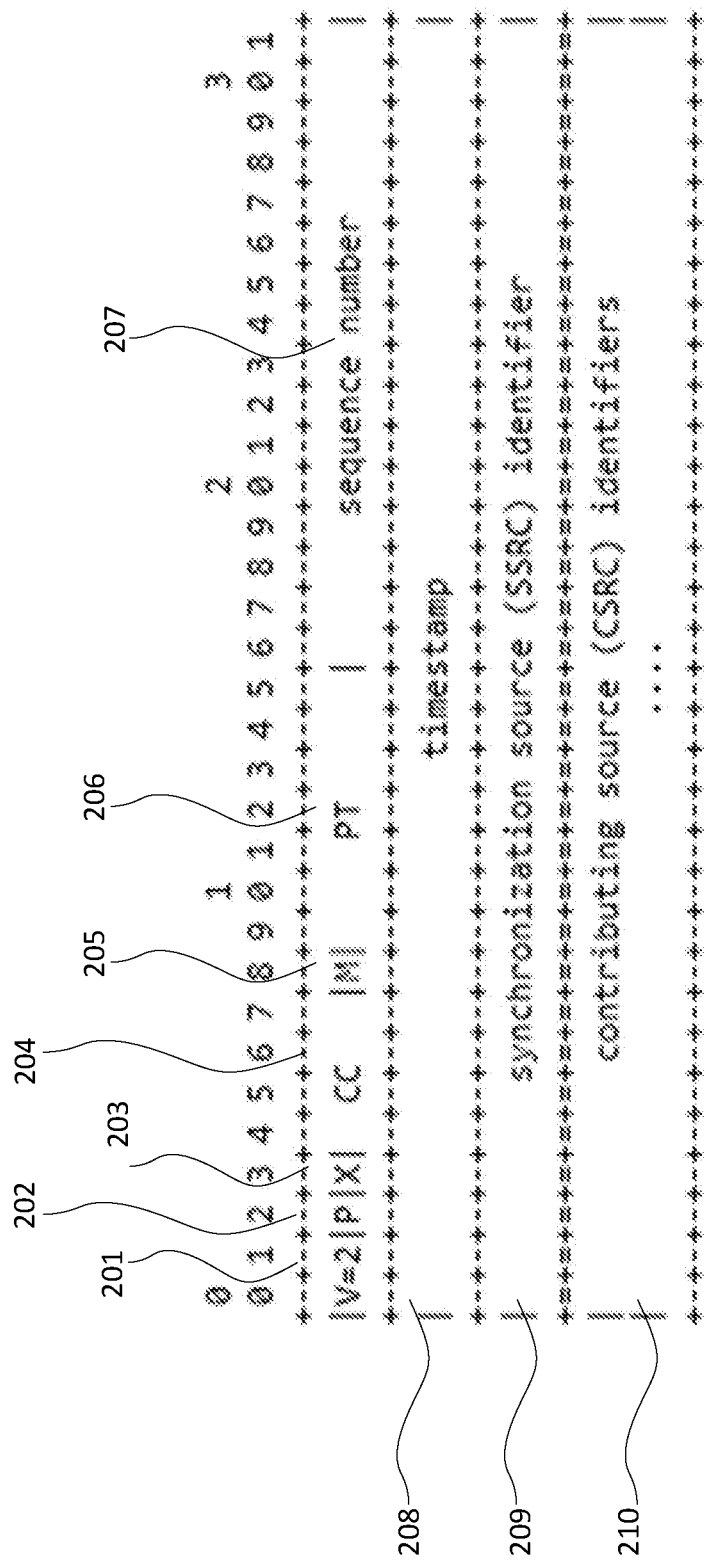
FIG. 2 is a schematic illustration of an RTP header, in accordance with an embodiment.

Certain real-time communication techniques for video over the Internet and other IP networks rely on the RTP, specified in RFC 3550. In some cases, RTP packets are transported over UDP over IP from one endpoint or MANE to another. Referring to FIG. 2, shown is an RTP header structure as specified in RFC3550. Each RTP packet starts with the RTP packet header. FIG. 2 illustrates the format of the RTP header as specified in RFC3550.

Version (V) field (201) identifies the version of RTP and is equal to 2. The Padding (P) field (202) specifies whether the packet contains one or more additional padding octets at the end. The Extension (X) field (203) indicates whether the fixed header is followed by exactly one header extension. The CSRC count (CC) field (204) contains the number of CSRC identifiers (210) that follow the fixed header. The Marker (M) field (205) allows marking significant events such as Access Unit boundaries in the packet stream. The Payload Type (PT) field indicates the payload type (206)—the type of media in use, such as video encoded according to ITU-T Recommendation H.264 using RTP payload format RFC 6184 with a certain set of RFC3984 parameters. PT is in many cases selected/negotiated by a call control protocol. The RTP sequence number (207) increases by one for each RTP packet being sent until wrap-around. The RTP timestamp (208) is indicative of a time instant when the first sample represented in a packet has been sampled (capture time), and is commonly used as presentation time. The timestamp for at least some video codecs is 90 kHz, whereas for many audio codecs, the timestamp is equal to the sampling rate such as 8 kHz, 44.1 kHz, or 48 kHz. The synchronization source (209) and contributing source (210) are introduced below only to the extent necessary.

RTP follows the general approach of application layer framing, and hence the adaptation to certain payloads, such as coded video formats specified according to certain video coding standards, can be specified by helper specifications outside of the main RTP specification known as RTP payload formats. Certain RTP payload formats re-use the bits of the Network Abstraction Header, as present in certain video coding standards such as H.264 or H.265, as their payload header. In such RTP payload formats and video coding standards, a Network Abstraction Layer Unit (NAL unit or NALU) can be a bitstring of finite size, covering one coded picture or a well-defined part thereof, such as, for example, a slice, tile, GOB, and so forth.

The bitstring can include, at its beginning, a comparatively short data structure of, for example 8 or 16 bits in length, that contains minimal information related to the type of the bitstring included and, in some scenarios, layering information.

As discussed above, the RIP header may include a so-called "Marker" bit (M-bit) (205). By convention, in substantially all RTP payload formats that recognize the concept of an AU, the M-bit is specified to equal to one for the RTP packet carrying the last bitstring of the AU, and otherwise to be set to zero. When a receiver receives the RTP packet with the M-bit set, it knows that this RTP packet is the last packet of an AU and can handle it accordingly. Some details of such handling can be found in the RTP specification. Referring again to FIG. 1, assuming that sending endpoint (11) obtains its sending video bitstream from storage device/hard drive (16), such file may not include easily accessible meta information concerning access unit or coded picture boundaries, for example because the bitstream may be stored, for example, in a format commonly known as "Annex B bitstream". In such a scenario, there may be no Application Programmer's Interface (API) information from the encoder to the RIP packetizer available that signals that a bitstring of the bitstream is the final bitstring of an AU or a coded picture. Instead, an RTP packetizer may have to identify the bitstring that includes the end of an AU or coded picture without side information usually obtainable by the encoder.

Figure 3:
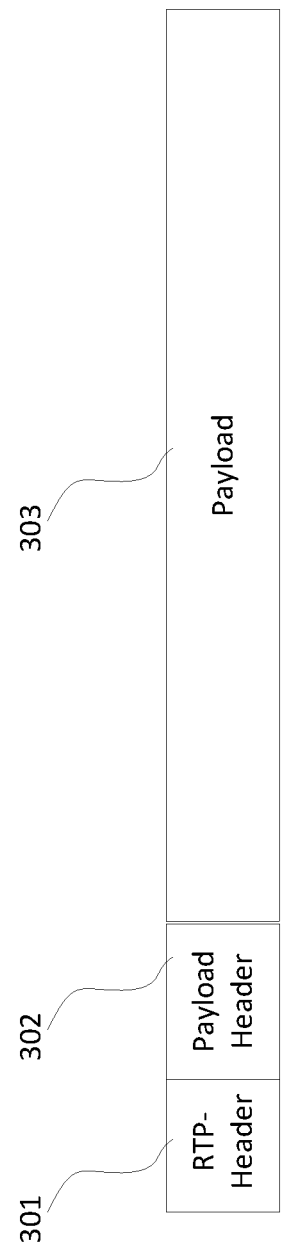
FIG. 3 is a schematic illustration of a RTP including a payload header and actual payload, in accordance with an embodiment.

In an embodiment, RTP packets can be used by the transport layer for the delivery of media data, including video and audio. Referring to FIG. 3, each RTP packet starts with the RTP header. The RTP header fields have already been introduced above. In the same or another embodiment they can be set in accordance with RFC 3550 and an applicable RTP payload specification.

In the same or another embodiment, the RTP packet can further include an RTP payload header (302). The RTP payload header format can be specified, for example, in the RTP payload specification applicable for a given payload. A given payload can be, for example video coded in accordance with the VVC specification, also known as ITU-T Rec. H.266. The purpose of an RTP payload header can be include, for example:

a) provide control information related to the payload and useful for the depacketizer, jitter buffer management, and so forth, to the extent it is not available in the RTP header (301) and/or not available or not easily obtainable from the payload (303) itself. For example, the payload (303) may be coded using complex variable length codes, arithmetic codecs, and so forth, that may be adequate for decoding purposes but too heavyweight for a depacketizer located in a MANE;

b) provide for additional functionality. Example of the latter include the fragmentation of units of video (such as, for example, codec pictures, coded slices, NAL units, and so forth); aggregation of units of video; redundant copies of certain syntax elements tp enable easy access and/or redundancy in case of packet loss, and so forth.

The RTP payload header (202) can be followed by the RTP payload (303). The RTP payload can be coded according a media codec specification such as an audio codec or a video codec specification, and can include, for example, one or more compressed or uncompressed audio samples, compressed or uncompressed pictures or parts thereof, and so forth.

Henceforth, embodiments may relate to video coded in accordance with the VVC specification, and a corresponding RTP payload format.

VVC uses a video bitstream structure based on NAL units. A NAL unit can be a bitstring of coded video bits representing control data—non-Video Coding Layer (VCL-) NAL units—or compressed video data pertaining to a picture, slice, tile, or similar structure (VCL NAL units). According to certain RTP payload formats, one RTP packet can carry in its payload (203) either a single NAL unit (in which case the NAL unit header co-serves as RTP payload format header), multiple NAL units (aggregation packet, which has its own NAL-unit-like structure as the RTP payload header, followed by two or more NAL units), and a fragment of a NAL unit (in which case the RTP payload header is used for control information for the fragmentation, and is followed by the fragment of the NAL unit.)

Regardless of how many packets (or fragments thereof) an RTP packet carries, it can be advantageous for a de-packetizer to be able to identify the last packet of a given coded picture. In certain non-layered environments, this can be achieved through the Marker (M) bit of the RTP header (205). In particular, according to certain RTP profiles and RTP payload formats,.

In the same or another embodiment, when the marker bit is set equal to 1, it indicates the current packet may be the last packet of the access unit in the current RTP stream. When the marker bit is set equal to 0, it indicates that the current packet may not be the last packet of the access unit. As in certain non-layered environments the AU boundary can be identical to the coded picture boundary, the marker bit can co-serve as the picture boundary indication. However, in layered environments and also in certain non-layered environments involving, for example, redundant pictures, the Marker bit, when set at AU boundaries, cannot also indicate coded picture boundaries because there may be more picture boundaries than AU boundaries.

Figure 4:
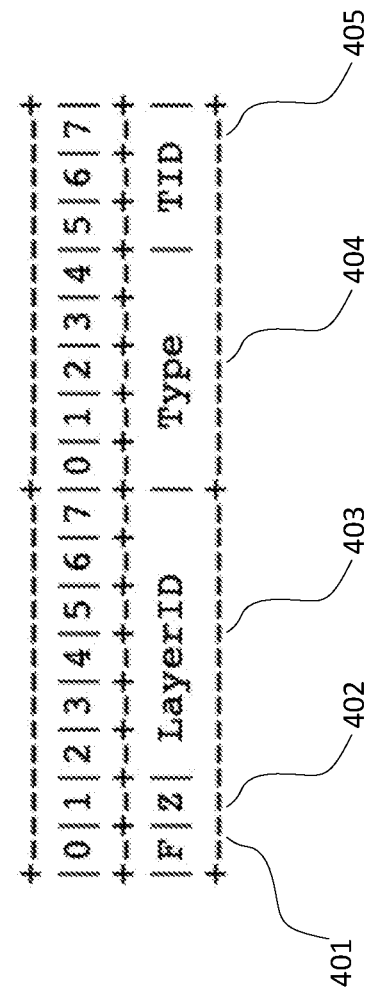
FIG. 4 is a schematic illustration of a NAL unit header in VVC with a bit boundary, in accordance with an embodiment.

Referring to FIG. 4, in the same or another embodiment, a VVC NAL unit header may include two bytes (16 bits). The forbidden-zero bit F (401) is always zero. 5 bits are used to represent the NAL unit type (404), implying that there can be up to 32 types of NAL units or NAL-unit like structures. VCL NAL units fall into a numerical range between zero and 12, and non-VCL NAL units types range between 13 and 31. The Z bit (402), LayerID (403) and Temporal ID (405) are used to manage spatial/SR and temporal layering, respectively, and are not further described here.

In the VVC RTP payload format, three different types of RTP packet payload structures are specified. A receiver can identify the type of an RTP packet payload through the Type field in the payload header. Single NAL unit packet contains a single NAL unit in the payload, and the NAL unit header of the NAL unit also serves as the payload header. Aggregation Packet (AP) contains more than one NAL unit within one access unit, and are not further described herein. Fragmentation Packets contain a Fragmentation Unit (FU) that in turn contains a subset of a single NAL unit.

Fragmentation Units (FUs) enable fragmenting a single NAL unit into multiple RTP packets. A fragment of a NAL unit may be composed of an integer number of consecutive octets of the NAL unit. Fragments of the same NAL unit may be transmitted in consecutive order with ascending RTP sequence numbers. When a NAL unit is fragmented and conveyed within FUs, it is referred to as a fragmented NAL unit.

Figure 5:
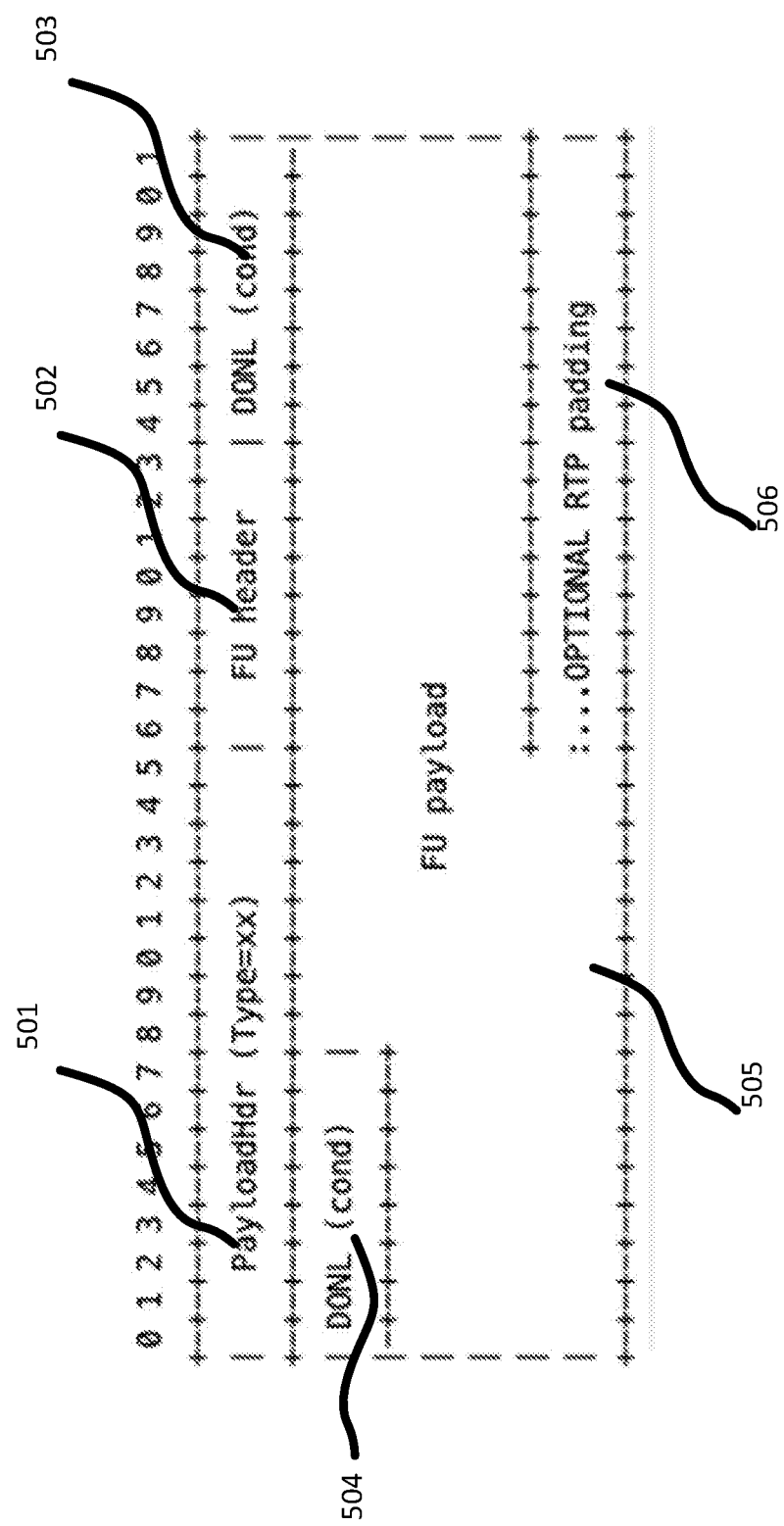
FIG. 5 is a schematic illustration of a fragmentation unit (FU) payload format, in accordance with an embodiment.

Referring to FIG. 5, in the same or another embodiment, an FU packet may include a NAL unit payload header (501) indicating that this packet is a fragmentation packet, including various fields as described below, the FU payload (505), and optional RTP padding (506), as well as the FU header (502) and, conditionally, a decoding order number difference (DONL) (504) coded in network byte order.

Figure 6:
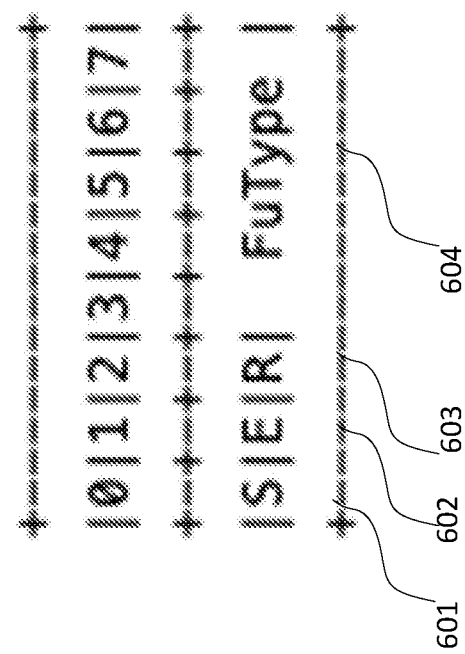
FIG. 6 is a schematic illustration of a FU header for a Verstile Video Coding (VVC) payload, in accordance with an embodiment.

In the same or another embodiment, referring to FIG. 6, the NAL unit type of the NAL unit whose fragment is carried in the FU is signaled in FuType (604) with 5 bits. FU header may further include an S bit, an E bit, an R bit. The S bit (601) is set for the first fragment of a NAL unit, otherwise cleared; and the E-bit (602) is set for the last fragment of a NAL unit, otherwise cleared.

In the same or another embodiment, the R bit (603) may be reserved for future use; set to for example 0 by packetizers, and ignored by depacketizer.

In the same or another embodiment, the R bit (603) may be indicative of the first fragment of the first NAL unit in decoding order of a coded picture. If the fragment is the first fragment of the first NAL unit in decoding order of a coded picture, the bit may be set to 1, otherwise to 0. An RTP payload spec could also reverse those semantics, where if the fragment is the first fragment of the first NAL unit in decoding order of a coded picture, the bit may be set to 0, otherwise to 1.

In the same or another embodiment, the R bit (603) may be indicative of the last fragment of the last NAL unit in decoding order of a coded picture. If the fragment is the last fragment of the last NAL unit in decoding order of a coded picture, the bit may be set to 1, otherwise to 0, An RIP payload spec could also reverse those semantics, where if the fragment is the last fragment of the last NAL unit in decoding order of a coded picture, the bit may be set to 0, otherwise to 1.

In the same or another embodiment, a NAL unit may be determined to be the last NAL unit of a picture if it is the last NAL unit of the bitstream. A NAL unit naluX may also be determined to be the last NAL unit of an picture, if one of the following conditions are true: 1) the next VCL NAL unit naluY in decoding order has nal_unit_type equal to 19 (i.e. PH_NUT) or 2) the high-order bit of the first byte after its NAL unit header (i.e. picture_header_in_slice_header_flag) is equal to 1.

In the same or another embodiment, a syntax element or bit similar to the R bit may be placed not in the FU header but in another appropriate syntax structure of the RT payload header; for example in the payload header itself, an aggregation packet header, and aggregation unit header, and so forth.

Figure 7:
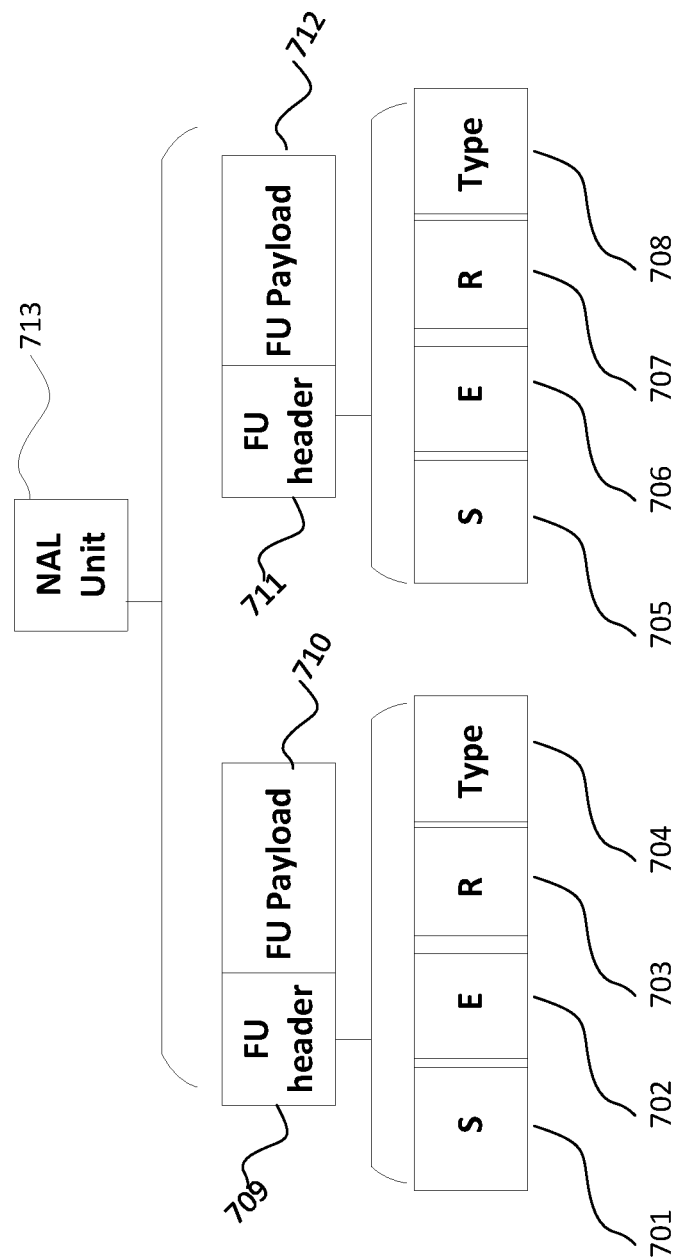
FIG. 7 is a schematic illustration of a VCL NAL unit header with two FU structures, in accordance with an embodiment.

Referring to FIG. 7, in the same or another embodiment, shown is a NAL unit (713) that has been fragmented into two RIP packets in order to illustrate the use of FUs. When transmitted over an IP network using RTP, the fragments of the same NAL unit may he transmitted in consecutive order with ascending RTP sequence numbers.

A NAL unit 713 may be divided into two fragments, and each fragment may be carried in its own RTP packet. Fragmentation into more than two packets are also possible.

For example, the NAL unit (713) may contain n bits, and is divided into two fragments carried as a first FU payload (710) of k bits, and a second FU payload (712) of n-k bits. Each of the two FU payloads are preceded by their respective FU headers, for example FU payload (710) is preceded by FU header (709) and FU payload (712) is preceded by FU header (711).

In an embodiment, within the first FU header (709), the S bit (701) may be set and the E bit (702) may be cleared to indicate that this is the first fragment of the NAL unit. The Type field (704) is set to the type of the NAL unit. The R bit (703) may be set as described in one of the alternatives above. For example, if NAL unit (713) is a first NAL unit of a picture, the R bit (703) may be set to indicate that the fragment included in FU payload (710) is a first fragment of a first NAL unit of a picture.

In the second FU header (711), the S bit (705) is cleared and the E bit (706) is set to indicate that this is the final fragment of the NAL unit. The Type field (708) is set to the type of the NAL unit. The R bit (707) is set as described in one of the alternatives above. For example, if NAL unit (713) is a last NAL unit of a picture, the R bit (707) may be set to indicate that the fragment included in FU payload (712) is a last fragment of a last NAL unit of a picture.

In an embodiment, a method for packetization by a packetizer of a NAL unit into a plurality of RTP packets in accordance with at least one RTP payload specification, may include splitting the NAL unit into a plurality of fragments; packetizing each fragment into an RTP packet including an FU header, the FU header including an R bit. In an embodiment, the R bit may be set by the packetizer if the NAL unit is the last NAL unit of a coded picture, and otherwise cleared.

In an embodiment, a method for de-packetization by a depacketizer of a NAL unit from a plurality of RTP packets in accordance with at least one RTP payload specification may include: decoding the NAL unit; depacketizing each fragment from an RTP packet including an FU header, the FU header including an R bit, and assembling the NAL unit from the plurality of fragments. In an embodiment, the R bit observed by the packetizer may be equal to one if the NAL unit is the last NAL unit of a coded picture and otherwise zero.

Figure 8:
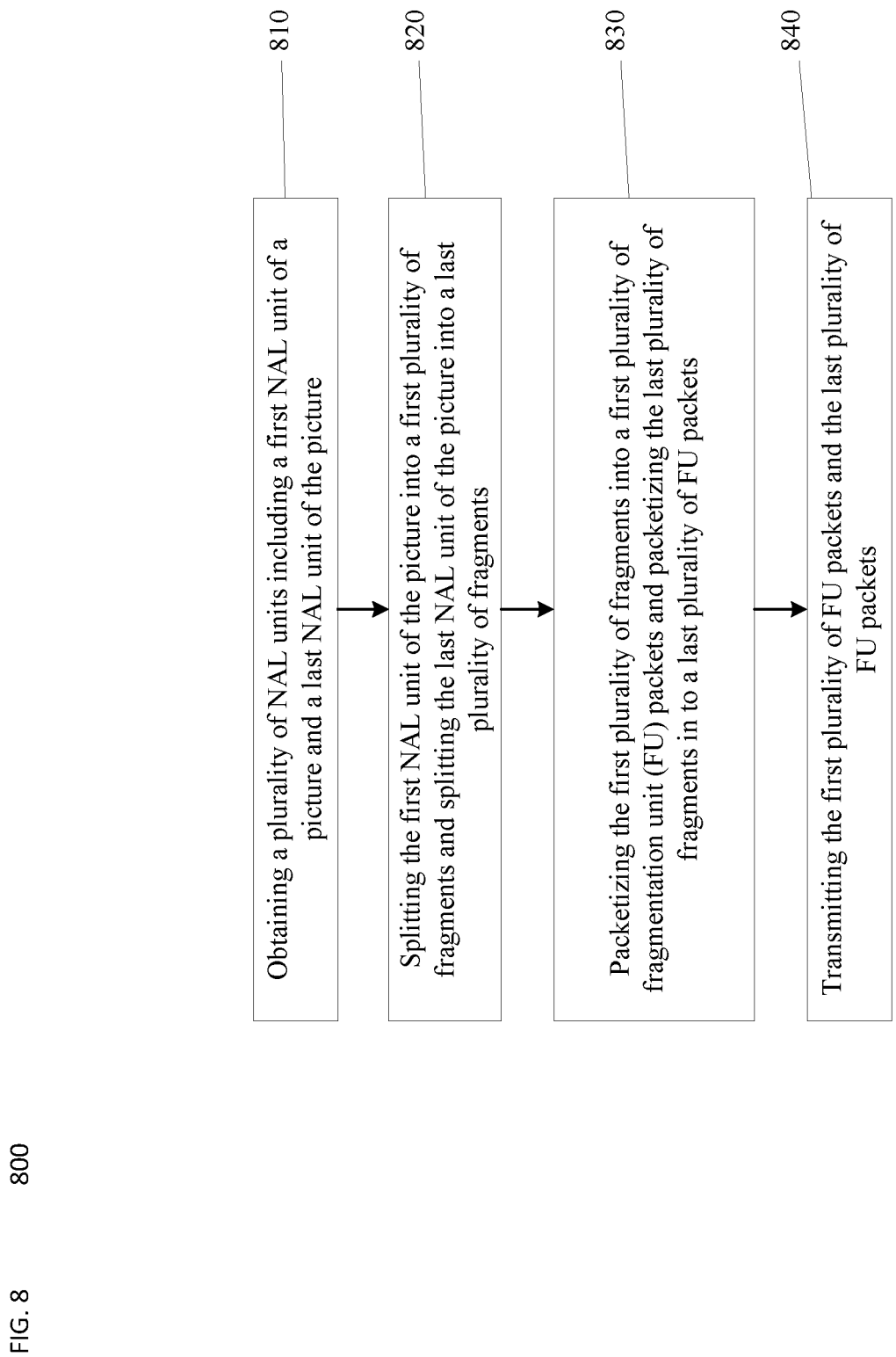
FIG. 8 is a flowchart of an example process for packetizing a plurality of network abstraction layer (NAL) units of a picture in accordance with an embodiment

FIG. 8 is a flowchart is an example process 800 for packetizing a plurality of NAL units of a picture using at least one processor. In some implementations, one or more process blocks of FIG. 8 may be performed by, for example, the packetizer or de-packetizer discussed above. In some implementations, one or more process blocks of FIG. 8 may be performed by another device or a group of devices, for example the endpoints and MANEs discussed above.

As shown in FIG. 8, process 800 may include obtaining the plurality of NAL units, including a first NAL unit of the picture and a last NAL unit of the picture (block 810).

As further shown in FIG. 8, process 800 may include splitting the first NAL unit of the picture into a first plurality of fragments and splitting the last NAL unit of the picture into a last plurality of fragments (block 820).

As further shown in FIG. 8, process 800 may include packetizing the first plurality of fragments into a first plurality of fragmentation unit (FU) packets and packetizing the last plurality of fragments in to a last plurality of FU packets. In embodiments, a last FU packet of the last plurality of FU packets may include a last FU header including a last R bit, and the last R bit may be set, for example set to 1 (block 830).

As further shown in FIG. 8, process 800 may include transmitting the first plurality of FU packets and the last plurality of FU packets (block 840).

In an embodiment, the first plurality of FU packets and the last plurality of FU packets may include real-time transport protocol (RTP) packets.

In an embodiment, a first FU packet of the first plurality of FU packets may include a first FU header including a first R bit, and the first R bit may be set to 0.

In an embodiment, a first FU packet of the first plurality of FU packets may include a first FU header including a first S bit, and the last FU header may include a last S bit.

In an embodiment, the first S bit may be set to 1, and the last S bit may be set to 0.

In an embodiment, the plurality of NAL units may include a middle NAL unit between the first NAL unit and the last NAL unit, the middle NAL unit may be split into a middle plurality of fragments, and the middle plurality of fragments may be packetized into a middle plurality of FU packets.

In an embodiment, a first FU packet of the first plurality of FU packets may include a first FU header including a first E bit, a last FU packet of the middle plurality of FU packets may include a middle FU header including a middle E bit, and the last FU header may include a last E bit.

In an embodiment, the first E bit may be set to 0, wherein the middle E bit may be set to 1, and the last E bit may be set to 0.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques for signaling and identifying picture boundary in video payload format over IP network. described above, can be implemented as computer software using computer-readable instructions and physically stored in one or more computer-readable media. For example, FIG. 9 shows a computer system 900 suitable for implementing certain embodiments of the disclosed subject matter.

The computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units ((CPUs), and the like.

The instructions can be executed on various types of computers or components thereof, including, for example, personal computers, tablet computers, servers, smartphones, gaming devices, interne of things devices, and the like.

The components shown in FIG. 9 for computer system 900 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove 904, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data-glove 904, or joystick 905, but there can also be tactile feedback devices that do not serve as input devices), audio output devices (such as: speakers 909, headphones (not depicted)), visual output devices (such as screens 910 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dangles (not depicted), and the like.

Those skilled in the art should also understand that term "computer readable media" as used in connection with the presently disclosed subject matter does not encompass transmission media, carrier waves, or other transitory signals.

Computer system 900 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (849) (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. Architectures for a peripheral bus include PCI, USB, and the like.

CPUs 941, GPUs 942, FPGAs 943, and accelerators 944 can execute certain instructions that, in combination, can make up the aforementioned computer code. That computer code can be stored in ROM 945 or RAM 946. Transitional data can be also stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 900, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of packetizing a plurality of network abstraction layer (NAL) units of a picture using at least one processor, the method comprising:
    obtaining the plurality of NAL units including a first NAL unit of the picture and a last NAL unit of the picture;
    splitting the first NAL unit of the picture into a first plurality of fragments and splitting the last NAL unit of the picture into a last plurality of fragments;
    packetizing the first plurality of fragments into a first plurality of fragmentation unit (FU) packets and packetizing the last plurality of fragments in to a last plurality of FU packets; and
    transmitting the first plurality of FU packets and the last plurality of FU packets,
    wherein a last FU packet of the last plurality of FU packets includes a last FU header including a last E bit and a last R bit, and
    wherein the last R bit is set to 1, and
    wherein the last R bit being set to 1 indicates that a fragment corresponding to the last FU packet of the last plurality of FU packets is a last fragment of the last NAL unit of the picture.

2. The method of claim 1, wherein the first plurality of FU packets and the last plurality of FU packets comprise real-time transport protocol (RTP) packets.

3. The method of claim 1, wherein a first FU packet of the first plurality of FU packets includes a first FU header including a first R bit, and
    wherein the first R bit is set to 0.

4. The method of claim 1, wherein a first FU packet of the first plurality of FU packets includes a first FU header including a first S bit,
    wherein the last FU header includes a last S bit.

5. The method of claim 4, wherein the first S bit is set to 1, and
    wherein the last S bit is set to 0.

6. The method of claim 1, wherein the plurality of NAL units includes a middle NAL unit between the first NAL unit and the last NAL unit,
    wherein the middle NAL unit is split into a middle plurality of fragments,
    wherein the middle plurality of fragments is packetized into a middle plurality of FU packets.

7. The method of claim 6, wherein a first FU packet of the first plurality of FU packets includes a first FU header including a first E bit,
    wherein a last FU packet of the middle plurality of FU packets includes a middle FU header including a middle E bit,
    wherein the last FU header includes the last E bit.

8. The method of claim 7, wherein the first E bit is set to 0,
    wherein the middle E bit is set to 1, and
    wherein the last E bit is set to 0.

9. A device for packetizing a plurality of network abstraction layer (NAL) units of a picture, the device comprising:
    at least one memory configured to store program code; and
    at least one processor configured to read the program code and operate as instructed by the program code, the program code including:
    obtaining code configured to cause the at least one processor to obtain the plurality of NAL units including a first NAL unit of the picture and a last NAL unit of the picture;
    splitting code configured to cause the at least one processor to split the first NAL unit of the picture into a first plurality of fragments and splitting the last NAL unit of the picture into a last plurality of fragments;
    packetizing code configured to cause the at least one processor to packetize the first plurality of fragments into a first plurality of fragmentation unit (FU) packets and packetizing the last plurality of fragments in to a last plurality of FU packets; and
    transmitting code configured to cause the at least one processor to transmit the first plurality of FU packets and the last plurality of FU packets,
    wherein a last FU packet of the last plurality of FU packets includes a last FU header including a last E bit and a last R bit,
    wherein the last R bit is set to 1, and
    wherein the last R bit being set to 1 indicates that a fragment corresponding to the last FU packet of the last plurality of FU packets is a last fragment of the last NAL unit of the picture.

10. The device of claim 9, wherein the first plurality of FU packets and the last plurality of FU packets comprise real-time transport protocol (RTP) packets.

11. The device of claim 9, wherein a first FU packet of the first plurality of FU packets includes a first FU header including a first R bit, and
    wherein the first R bit is set to 0.

12. The device of claim 9, wherein a first FU packet of the first plurality of FU packets includes a first FU header including a first S bit,
    wherein the last FU header includes a last S bit.

13. The device of claim 12, wherein the first S bit is set to 1, and
    wherein the last S bit is set to 0.

14. The device of claim 9, wherein the plurality of NAL units includes a middle NAL unit between the first NAL unit and the last NAL unit,
   wherein the middle NAL unit is split into a middle plurality of fragments,
   wherein the middle plurality of fragments is packetized into a middle plurality of FU packets.

15. The device of claim 14, wherein a first FU packet of the first plurality of FU packets includes a first FU header including a first E bit,
   wherein a last FU packet of the middle plurality of FU packets includes a middle FU header including a middle E bit.
   wherein the last FU header includes the last E bit.

16. The device of claim 15, wherein the first E bit is set to 0,
   wherein the middle E bit is set to 1, and
   wherein the last E bit is set to 0.

17. A non-transitory computer-readable medium storing instructions, the instructions comprising: one or more instructions that, when executed by one or more processors of a device for packetizing a plurality of network abstraction layer (NAL) units of a picture, cause the one or more processors to:
   obtain the plurality of NAL units including a first NAL unit of the picture and a last NAL unit of the picture;
   split the first NAL unit of the picture into a first plurality of fragments and splitting the last NAL unit of the picture into a last plurality of fragments;
   packetize the first plurality of fragments into a first plurality of fragmentation unit (FU) packets and packetizing the last plurality of fragments in to a last plurality of FU packets; and
   transmit the first plurality of FU packets and the last plurality of FU packets,
   wherein a last FU packet of the last plurality of FU packets includes a last FU header including a last E bit and a last R bit,
   wherein the last R bit is set to 1 and
   wherein the last R bit being set to 1 indicates that a fragment corresponding to the last FU packet of the last plurality of FU packets is a last fragment of the last NAL unit of the picture.

18. The non-transitory computer-readable medium of claim 17, wherein the first plurality of FU packets and the last plurality of FU packets comprise real-time transport protocol (RTP) packets.

19. The non-transitory computer-readable medium of claim 17, wherein a first FU packet of the first plurality of FU packets includes a first FU header including a first R bit, and
   wherein the first R bit is set to 0.

20. The non-transitory computer-readable medium of claim 17, wherein a first FU packet of the first plurality of FU packets includes a first FU header including a first S bit,
   wherein the last FU header includes a last S bit,
   wherein the first S bit is set to 1, and
   wherein the last S bit is set to 0.

* * * * *